Jan. 16, 1940.  J. LANE  2,187,381
PASTEBOARD PRINTING FRAME
Filed July 6, 1938　　2 Sheets-Sheet 1
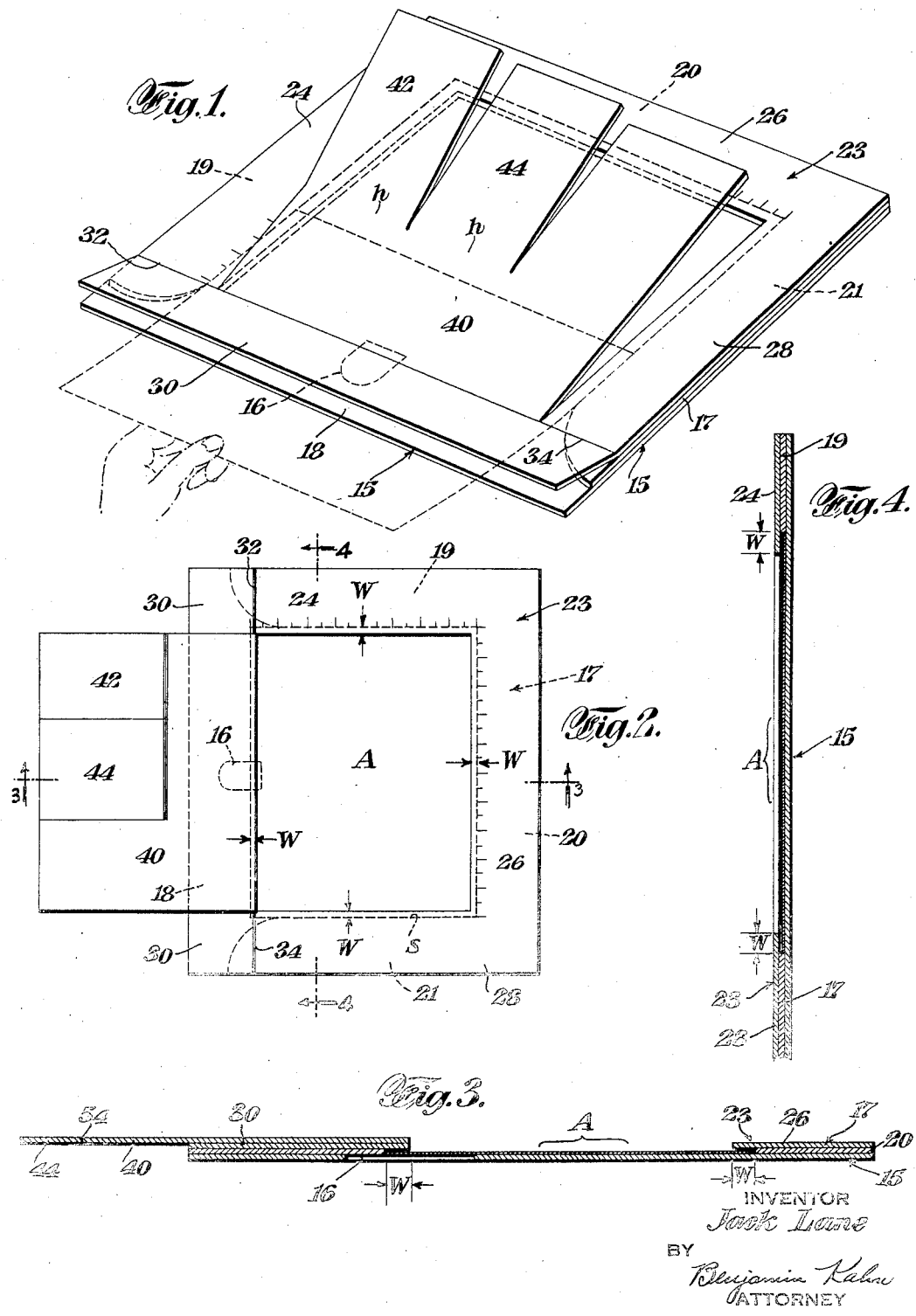
INVENTOR
Jack Lane
BY
Benjamin Kahn
ATTORNEY Jan. 16, 1940.  J. LANE  2,187,381
PASTEBOARD PRINTING FRAME
Filed July 6, 1938  2 Sheets-Sheet 2
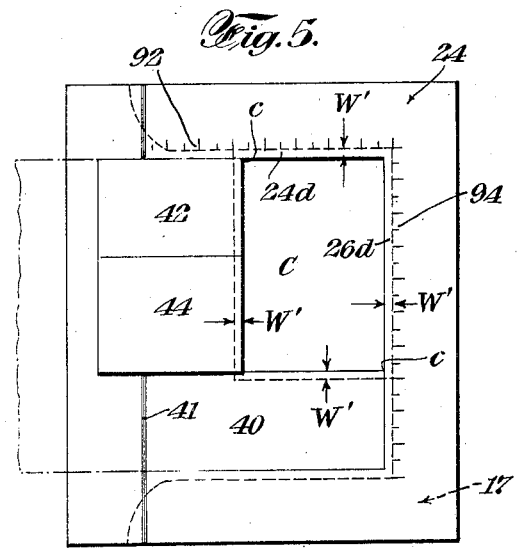
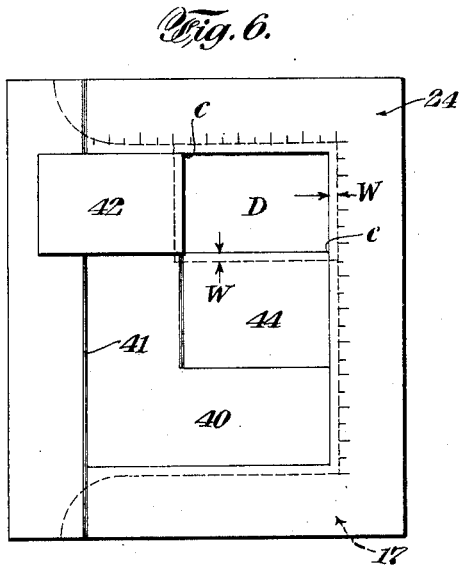
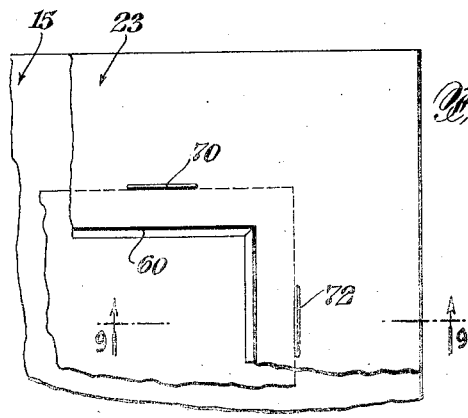
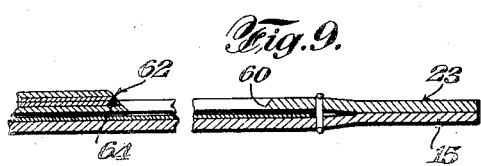
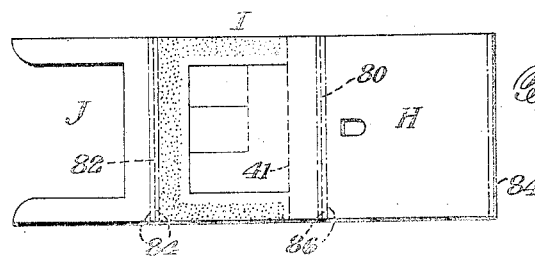
INVENTOR
Jack Lane
BY Benjamin Kahn
ATTORNEY Patented Jan. 16, 1940

2,187,381

UNITED STATES PATENT OFFICE 2,187,381

PASTEBOARD PRINTING FRAME

Jack Lane, New York, N. Y.

Application July 6, 1938, Serial No. 217,675

8 Claims. (Cl. 95—79)

This invention relates to photo-printing easels or frames, and more particularly to pasteboard frames or easels to provide a light responded complete marginal boundary or border on an exposed sensitized sheet.

More particularly this invention relates to printing easels or frames of the above type adapted for use with a preselected group or series of standard sized sensitized sheets as are available on the market, each standard sheet being of definite predetermined picture area dimensions, and all of the different picture sizes having like border widths.

This invention further relates to photo-printing apparatus commonly known as the top or front feed type, having a swingable frame under which the sensitized sheet is placed, sensitized face up and under the frame, the frame being operative from the light source side, its rear face adapted to urge the sensitized sheet in pressure contact against a rear support. Such type of apparatus operates in distinction to those having an intervening transparency or stationary supporting marginal frame against which the sensitized surface of the printable sheet is urged into contact by a non-stationary or swingable rear means.

One of the principal objects of the invention is to provide a device of the above character adapted for enlargement or reduction work, and adapted for contact printing.

Another principal object of the invention is the production of a simple, rugged, highly efficient, and highly inexpensive easel adapted for rapid print production in the photo-printing art.

Another important object of the invention is the provision of such a printing device, adapted as a light shroud or mask to provide a developable frame of standard border width along the marginal edge of the sides of the picture area.

A further object of the invention is the provision of a device of the above character adapted for easy manipulation, whereby photographic prints are produced having a picture area sharply defined by a border in exposure tone contrast, of particularly straight, sharp definition between the picture area and the border, and having sharp right angle corners without any light diffusion threreat.

While the accomplishment of the above objectives includes certain characteristic steps inherent in photographic reproduction, the particular construction of the subject device gives rise to the advantages aforementioned in the objectives.

Cognizance is taken of prior art devices comprising cumbersome wooden boxes, which must of necessity be made strong, and of thick walls, to support relatively heavy moving parts, and relatively strong and projecting pivots rendering such prior art devices useless for the purposes upon which this invention is predicated, such purposes being outlined in the objectives hereabove.

Cognizance is also taken of prior art devices adapted for the purposes of vignette effects along one or more margins of the picture area.

The objectives are, in part, accomplished by the employment of a base sheet having right angular place defining means at least at one corner thereof, said means providing a raised deck at a level substantially the same thickness as that of the sensitized stock employed therewith. Overlying these elements is an upper layer of pasteboard material having cut scores and crease scores therein, constituting varying size frame, said scores providing fixed picture area flaps of varying sizes within the said border portion. Some of the smaller flaps are included within the next succeeding larger. Each one of the picture flaps is hinged along one marginal edge thereof. The marginal registering means for the stock is disposed between the upper frame and the lower base sheet, and is set back from the frame opening. Insertion of the largest size picture is edgewise between the upper and base layers, and insertion of the smaller sizes is provided by hinging clearance of the flaps.

The flaps are of such area and disposition as to superimpose or uncover a corresponding picture area, the corresponding border being covered by the portions of the upper sheet adjacent the particular flap in use and adapted to cover and mask the border of the given standard size picture.

Other objects and advantages will appear in the following description, having reference to the accompanying drawings, wherein:

Figure 1 is a perspective view of a preferred form of the subject device, illustrating the manner of inserting a sensitized sheet of the largest usable size.

Figure 2 is a plan view illustrating the relative position of the parts during exposure of the sensitized sheet inserted in Figure 1.

Figure 3 is a sectional view taken substantially on the line 3—3 of Figure 2.

Figure 4 is a sectional view taken substantially on the line 4—4 of Figure 2.

Figure 5 is a plan view similar to Figure 2, illustrating the exposure of a next smaller size sheet illustrating in dot and dash the position of certain of the parts during insertion of a sheet.

Figure 6 is a view illustrating the position of the parts of the device shown in Figure 1, when employed in exposing the smallest size sensitized sheet.

Figure 7 is an enlarged view of a fragment of Figure 4, illustrating the cut and crease scores, and composition of a preferred laminated pasteboard employed.

Figure 8 is a fragmentary view of a corner of a modified form of the invention.

Figure 9 is a section taken substantially on the line 9—9 of Figure 8.

Figure 10 is a view of the cut and scored blank used in making the preferred form of the invention shown.

Referring to Figures 1 to 7 inclusive, there is provided a pasteboard sheet 15 adapted as a bottom or base layer of the device and having a finger opening 16 therein and along one of its sides 18 for the purpose to be later described. An intermediate harbor or bay layer 17 comprising marginal strip portions 19, 20, and 21 is provided, the said layer 17 being suitably secured to the upper surface of the base layer 15, preferably along the three sides thereof, and not including the side containing the finger hole 16.

These marginal portions 19, 20, and 21 are preferably but not essentially thin, and preferably of slightly less thickness than the sensitized sheet to be used, the purpose of this to be described later.

The portions 19 and 20 are adapted as right angle register means for all sizes of sheets. The strip 21 serves merely to maintain the superimposed sheet of upper frame 23 evenly spaced from the base 15.

The upper frame 23 is comprised of marginal frame portions 24, 26, and 28, and marginal strip 30 adapted to overlie or superimpose the marginal portion 19, 20, 21 of the intermediate sheet, and 18 of the base sheet, respectively. The marginal portion 30 constitutes a flap and is arranged to overlie the side 18 of the base and containing the finger hole 16. The marginal portions 24, 26, and 28 are adapted to be glued or otherwise suitably secured to the marginal strips 19, 20, and 21, which in turn are glued or otherwise secured to the base 15.

The marginal flap strip 30 is adapted to be freely swung along crease scores 32 and 34, joining the ends of the marginal portions 24 and 28 to the marginal strip 30. The marginal portions 24, 26, and 28 preferably terminate exterially even with the perimeter of the base sheet.

The marginal portions 24, 26, and 28, and the flap strip 30 form a border for a rectangular large picture area including flaps 40 and attached smaller flaps 42 and 44, the purpose of which will soon be described. The flap 40 is hinged as at 41 in a non-projecting manner as will be more fully described.

With this arrangement, it will be noticed in Figure 1 that the flap 40 constitutes an L shape, hinged at the left upright portion thereof to the marginal strip 30. The right side of said upright portion of the L shape provides the hinges for the flaps 42 and 44 operable in the crook of the L one adjacent the other.

When the device is used as an easel for the large size sheet, the picture area is that taken by the flaps 40, 42, and 44, which in this case, operate as a unit as indicated in Figure 2.

It will thus be noticed that when the flap 40 is swung open, the smaller flaps 42 and 44 follow, due to their hinged connection to the flap 40 and the large picture area A is thus exposed and the margin of the sheet at the distance W all around remains hidden from exposure.

The picture area A is therefore of predetermined size and forms the inner part of a standard sheet greater than the picture area A by the predetermined border width W bounding the picture area.

It will be noticed in Figure 5 that in printing the next smaller standard size picture, which is here termed the medium size picture, the picture area C exposed centrally within the edge of a standard medium sized sheet, thus providing an unexposed border of equal width W' all around, the width of said border being the same as that of the larger sized picture.

This is done by swinging out the flaps 42 and 44 only, leaving the L shaped flap 40 within the margins of the upper sheet frame. The inner edges of the crook of the L of the flap 40 thus forms the lower left boundary of the picture area C, and the inner edge overhanging portions 24d and 26d form the upper and right boundary for the picture area C.

Referring to Figure 6, the smallest size picture area D is provided for the small sheet of predetermined small standard size, leaving a similar border equal in width to the border of the larger sizes aforementioned around a small sized picture.

It is obvious that the picture border in each case is provided by masking the sensitized surface of the standard size stock, and the width of this border is automatically predetermined as for a given predetermined size sensitized sheet.

It will therefore be seen that the large sized sheet is fed edgewise into the bay provided by the middle layer, and under the overhanging inner portions 24d and 26d of the upper layer margins, and it will be appreciated that with a middle layer of thickness slightly less than the thickness of sensitized stock used, a frictional contact is established with the stock under the said overhanging portions 24d and 26d in all sizes.

The middle size sheet need not be inserted edgewise as is the larger sheet, but may be inserted under the overhanging portions 24d and 26d after raising the flap 40 sufficiently to permit insertion of the medium sheet.

The register for the sensitized stock comprises abutment of the edges of the marginal portions 19 and 20 and the top and right edges of the sensitized sheet for all sizes.

This overhang enables the positioning of the sensitized sheets with celerity and accuracy in the dark, thereby increasing production and avoiding finger print smudging.

The picture border masking margins 24d and 26d are preferably in close contact with the sensitized surface so as to prevent any passage or reflection of light beyond these margins, thereby giving sharp contrast between the exposed picture area and the unexposed bordering surfaces consisting of the light differential border of frame beyond the picture area of the sensitized sheet.

The flaps 40, 42, and 44 are yieldable on their hinges h, and positionable to contact with the sensitized surface on the margins opposite the margins 24d and 26d for medium and small picture sizes, thus preventing any light beams passing thereunder. The edges of the flaps along common cut scores are adapted to frictionally engage to serve as light seals. This edge contact extends to the corners c, (see Figs. 5 and 6), thus preventing any stray beams from exposing the sensitized surface at this point.

The pasteboard material employed is preferably of such thickness and character as to provide light sealing engagement of the edges thereof along the cut scores.

Referring to Figure 7, illustrating the cut scores and crease scores, the reference character 50 designates the body of the material preferably employed, having a kraft lamina 52 on one side thereof.

This kraft backing is adapted to form a strong hinge for the flaps as provided by a crease score 54, which comprises cutting the body up to but not including the severance of the kraft backing.

A cut score, such as 56, refers to complete severance of the sheet, including the body 50 as well as the kraft backing 52.

In the modified form illustrated in Figures 8 and 9, the cut scores may be beveled, as indicated at 60, and the crease scores 62 may have a beveled cut-in up to the kraft lamina, providing a hinge as at 64.

This construction provides a picture opening terminating in and defined by sharp edges so desirable for obtaining a sharp border line especially when the light beams are convergent upon the sensitized film during exposure of the stock. No shadow of the internal marginal edge of the mask is cast; there being no thickness of the mask at its border defining edge.

In Figures 8 and 9, staples 70 in alignment and at right angles with staples 72, also in alignment, may be employed to form the right angle register guide for the corresponding edges of the sensitized sheets. In this form the right angle register guides 19 and 20 are preferably omitted.

These staples are preferably adapted to yieldably hold the upper sheet 23 to the lower base sheet 15 and allow it to spread and compensate for varying thicknesses of sensitized stock, thereby maintaining mask contact with the sensitized surface of a sensitized sheet inserted between the upper and base sheets.

In Figure 10 there is illustrated a blank which may be employed to advantage in the construction of the preferred form of the invention. The blank comprises integral sections H, I, and J, the section H comprising the base; the section I comprising the upper layer; and the section J comprising the intermediate bay register layer.

Fold scores 80 and 82 are preferably provided to define the points of folding in order to obtain the superimposed layers in the order herein before described.

Adhesive may be applied to the stapled portions indicated or the several layers comprising the device may be held together by means of staples or the like.

The folded edges at the fold scores 80 and 82 of the device in this condition may be trimmed, leaving "fall-off" strips 84 and 86. By this manner of assembly, the alignment of the register edges of the bay layer with respect to the picture defining edges of the upper layer is easily determined by suitable prepositioning and predetermined folding.

Scales 92 and 94 may be provided on the upper surface of the upper layer for convenience in size reading of the standard sheet. Clips may be provided to hold the flaps against displacement by the curling tendency of the sensitized sheet.

Having thus described a principle of the invention in connection with several preferred embodiments thereof, it is to be understood that slight changes within the scope of the appended claims can be made without departing from the spirit of the invention.

What I desire to claim is:

1. A photographically sensitized sheet holder adapted for use with a series of different sized sheets, each of different length and width dimensions with the length or width dimensions of any of the adjacent sheets in the series common to a length or width dimension of an adjacent sheet in the series, said holder including an upper mask member comprising a frame portion adapted to provide an exposure opening for the largest sheet of said series, and a plurality of hinged flap portions all within said frame portion cooperative to provide a series of the exposure openings corresponding to the other smaller sized sheets of the series, the smallest exposure opening of said series being provided by a single flap and the other exposure openings of said series including the smallest flap and another, and registry means for all sizes of sheets disposed under said frame and outward of the largest exposure opening, said registry means adapted to be engaged by adjacent edges of all of the said sensitized sheets, whereby a light mask is provided over the sensitized surface and along all edges of any of the sheets, to provide sensitized borders, at least two of the borders being formed by the frame portions overlying the registry means.

2. A photographically sensitized sheet holder for use with a series of different sized sheets each of different length and width dimensions with adjacent sheets in the series having one common dimension, said holder including an upper mask member comprising flap portions, a frame having marginal portions, said flap portions cooperative with each other to provide a series of exposure openings corresponding to said series of sheets, two sides of each of said openings being defined by adjacent internal edges of said marginal portions of the frame, and registry means disposed under said marginal portions and outward of said adjacent exposure opening defining edges, said registry means adapted to be engaged by edges of sensitized sheets underlying said mask member, whereby a light-masked boundary of predetermined width is provided by said mask member, whereby a light-masked marginal boundary of predetermined width is provided by said mask member on any sized sensitized sheet upon exposure thereof through the corresponding exposure opening.

3. A photographically sensitized sheet holder for use with a series of different sized sensitized sheets each of different length and width dimensions with adjacent sheets of the series having one common dimension, said holder including an upper mask member comprising flap portions and a frame having marginal portions, said portions cooperative with each other to provide a series of exposure openings corresponding to said series of sheets, the length and width dimensions of the exposure openings being smaller than the dimension of their corresponding sheet size by predetermined increments, two angularly disposed sides of each of said openings being defined by corresponding internal edges of similar angularly disposed corresponding marginal portions, and registry means under said similar marginal portions and positionable outward of the said internal edges at a distance less than said increments, said registry means adapted to be engaged by related edges of sensitized sheets whereby border bounded picture areas are provided in predetermined positions on the sensitized sheets.

4. A photographically sensitized sheet holder for use with a series of different sized sensitized sheets each of different length and width dimensions with adjacent sheets of the series having one common length or width dimension, said holder including an upper mask member comprising flap portions and a frame having marginal portions, said portions cooperative with each other to provide a series of exposure openings corresponding to said series of sheets, both the length and width dimensions of the exposure openings being smaller than the dimensions of their corresponding sheet size by a unitary increment, two angularly disposed sides of each of said openings being defined by corresponding internal edges of similar angularly disposed corresponding marginal portions, and registry means under said last mentioned marginal portions and positioned outward of said internal edges at a distance equal to one half the said increment, said registry means adapted to be engaged by related edges of sensitized sheets whereby an equal width border boundary is provided on each size sensitized sheets upon exposure thereof through its corresponding exposure opening.

5. A photographically sensitized sheet holder adapted for use with a quadrangular sensitized sheet, said holder comprising a plurality of layers of pasteboard or the like including a base layer, an upper layer and an intermediate bay layer disposed between the said upper and base layers, said bay layer adapted to surround a sensitized sheet edgewise on not more than three sides thereof and adapted to provide registry means for said sheet at at least two of its internal and angularly disposed edges, said upper layer having a rectangular picture area defining opening therein within the projected confines of said bay layer, said sensitized sheet being insertable edgewise and between said upper and lower layers through the open edge of the bay layer, said base layer having a finger opening within the projected area of the sensitized sheet for manual engagement of the back of the sensitized sheet.

6. A photographically sensitized sheet holder adapted for use with a series of different sized quadrangular sensitized sheets of different area dimensions, said holder including an upper layer of pasteboard having flaps adapted to uncover corresponding picture areas, said upper layer having an upper sheet adapted to form the hinges for said pasteboard flaps whereby exposure is had without any shadow encroachment of the flaps upon the corresponding picture area.

7. A photographically sensitized sheet holder adapted for use with a plurality of different sized quadrangular sensitized sheets of different dimensions, said holder including an upper masking layer of pasteboard having flaps adapted to uncover correspondingly different picture areas and adapted to provide a complete boundary border for each of said areas by manipulation of said flaps, said picture areas being bounded by beveled edges common to the flaps and severed from said upper layer.

8. A photographically sensitized sheet holder adapted for use with a series of different sized quadrangular sheets, each having a dimension in length or width common to a length or width dimension of an adjacent sheet of the series, said holder including an upper mask member comprising a frame member adapted as a border mask for the largest of said sheets and wherewithin the exposure opening for said largest sheet is provided, a plurality of hinged flaps operably disposed within the said largest exposure opening whereby marginal light masks and exposure openings are provided for any one of the smaller-sized sheets, a right angular registry means operably positioned under said frame and outward of two adjacent sides of the large exposure opening, said registry means adapted to cooperate in positioning all of said sensitized sheets with respect to their corresponding exposure openings, each of said flaps adapted to uncover an exposure area less than its corresponding sheet size, leaving border portions along adjacent sides of said registry means said border portion being of the same width for all sized sheets of the series.

JACK LANE.